(12) United States Patent
Nii

(10) Patent No.: US 8,159,442 B2
(45) Date of Patent: Apr. 17, 2012

(54) LIQUID CRYSTAL DISPLAY DEVICE

(75) Inventor: Yusuke Nii, Mie (JP)

(73) Assignee: Sharp Kabushiki Kaisha, Osaka (JP)

( * ) Notice: Subject to any disclaimer, the term of this patent is extended or adjusted under 35 U.S.C. 154(b) by 941 days.

(21) Appl. No.: 11/992,072

(22) PCT Filed: Sep. 8, 2006

(86) PCT No.: PCT/JP2006/317894
§ 371 (c)(1),
(2), (4) Date: May 12, 2008

(87) PCT Pub. No.: WO2007/032285
PCT Pub. Date: Mar. 22, 2007

(65) Prior Publication Data
US 2009/0109153 A1 Apr. 30, 2009

(30) Foreign Application Priority Data
Sep. 16, 2005 (JP) .................. 2005-270813

(51) Int. Cl.
*G09G 3/36* (2006.01)
(52) U.S. Cl. .................. 345/98; 345/87; 345/100
(58) Field of Classification Search .......... 345/87, 345/98
See application file for complete search history.

(56) References Cited

U.S. PATENT DOCUMENTS

| | | | | |
|---|---|---|---|---|
| 5,587,683 A | * | 12/1996 | Kawasaki et al. | 327/538 |
| 5,798,723 A | * | 8/1998 | Fong | 341/136 |
| 5,912,655 A | * | 6/1999 | Hoshino et al. | 345/100 |
| 5,977,940 A | * | 11/1999 | Akiyama et al. | 345/94 |
| 7,352,243 B2 | * | 4/2008 | Nishimura | 330/257 |
| 2002/0047557 A1 | | 4/2002 | Kim | |
| 2003/0034941 A1 | * | 2/2003 | Janssen et al. | 345/87 |
| 2004/0196278 A1 | * | 10/2004 | Kida et al. | 345/211 |
| 2005/0030058 A1 | * | 2/2005 | Li et al. | 324/770 |
| 2005/0248515 A1 | * | 11/2005 | Naugler et al. | 345/77 |
| 2007/0247347 A1 | | 10/2007 | Matsui et al. | |

FOREIGN PATENT DOCUMENTS

| | | |
|---|---|---|
| JP | 3-257426 | 11/1991 |
| JP | 3257426 | 11/1991 |
| JP | 07-319430 | 12/1995 |
| JP | 7-319430 | 12/1995 |

(Continued)

*Primary Examiner* — Richard Hjerpe
*Assistant Examiner* — Alecia D English
(74) *Attorney, Agent, or Firm* — Harness, Dickey & Pierce, P.L.C.

(57) ABSTRACT

In one embodiment of the present application, a liquid crystal display device is disclosed, in which increased power consumption due to an excessive DAC capability and reduced display quality due to a deficient DAC capability do not occur as a result of dynamically adjusting the DAC capability such that variation in the characteristics of the liquid crystal panel is compensated. The liquid crystal display device comprises a digital-to-analog converter circuit that converts data signals inputted as digital signals to analog signals; a source driver that distributes and inputs analog signals output from the digital-to-analog converter circuit to a plurality of source lines Y; a differential amplifier that compares the voltage $V_1$ detected on the input side of a source line Y and voltage $V_2$ detected on the side opposite the input side of the source line Y; and a correcting circuit that corrects the output of the digital-to-analog converter circuit that corrects the output of the digital-to-analog converter circuit based on the comparison results of the differential amplifier.

8 Claims, 5 Drawing Sheets

FOREIGN PATENT DOCUMENTS

| | | |
|---|---|---|
| JP | 11-153779 | 6/1999 |
| JP | 2001-296845 | 10/2001 |
| JP | 2002-217734 | 8/2002 |
| JP | 2003-280593 | 10/2003 |

* cited by examiner

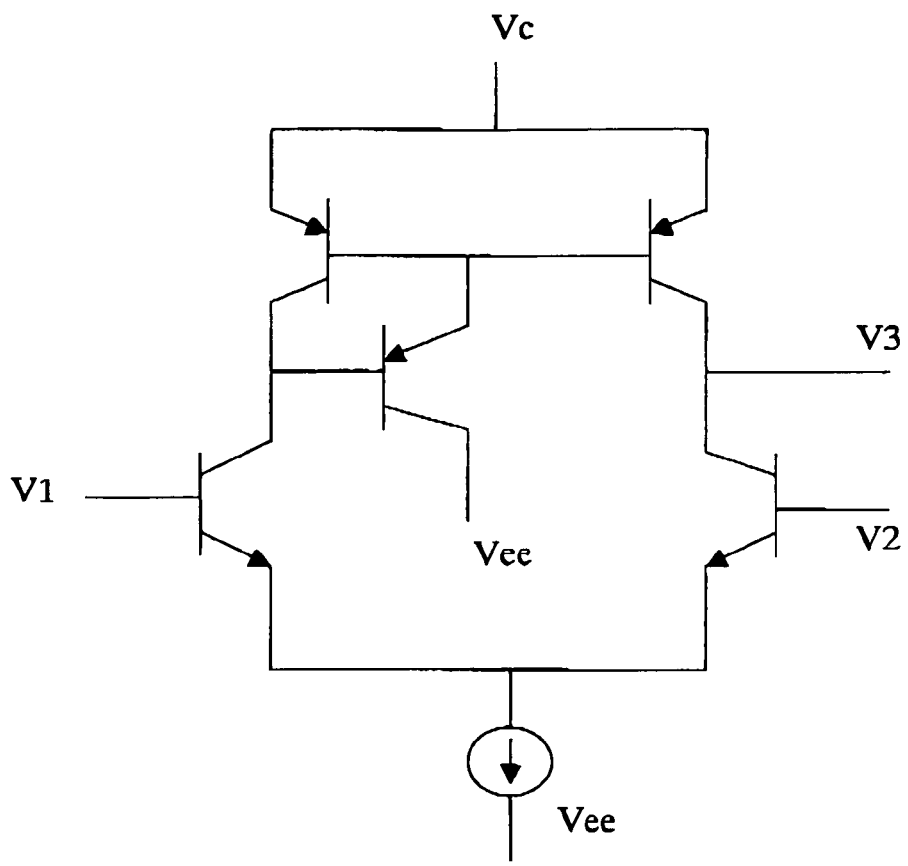
FIG. 3
FIG. 4A
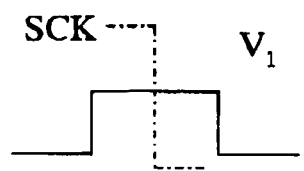
FIG. 4B
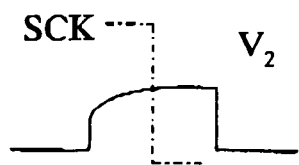

| | V3<=e1 | e1<V3<=e2 | e2<V3 |
|---|---|---|---|
| Output | 1111 | 0000 | 0001 |
| DAC output | − | 0 | + |

LIQUID CRYSTAL DISPLAY DEVICE

TECHNICAL FIELD

The present invention relates to liquid crystal display devices and, in particular, relates to a liquid crystal display device displaying images by receiving a data signal as a digital signal input and supplying analog signals obtained by digital-to-analog conversion to source lines.

BACKGROUND ART

Liquid crystal display devices have been known in the past that comprise a digital signal input terminal and receive a data signal etc. used for displaying images as a digital input. In order to convert the input digital signal to analog signals, such liquid crystal display devices comprise a digital-to-analog converter circuit (DAC) located between the above-mentioned digital signal input terminal and source lines (signal lines) disposed in the columnwise direction of the liquid crystal panel. This DAC is sometimes incorporated into a signal line driver circuit (source driver) and sometimes provided outside of the source driver. The data signals output from the DAC as analog signals are distributed and provided by the source driver as inputs to the source lines.

The DAC output capability is set such that an ideal output waveform is obtained. For instance, among the three types of waveforms respectively shown in FIGS. 6A-6C, the waveform of FIG. 6A is an ideal waveform. By contrast, the waveform of FIG. 6B exhibits considerable rounding of the pulse at the leading edge due to a deficient DAC output. In such cases, the charging of the source lines by the DAC may be deficient, adequate liquid crystal response may not be obtained, and display quality may decline. On the other hand, electric power is wasted if the output waveform looks like the waveform illustrated in FIG. 6C. Accordingly, the parameters of the DAC are set such that the output waveform of the DAC assumes the ideal shape illustrated in FIG. 6A. For instance, in case of an R-2R resistor ladder type DAC, the DAC output capability can be appropriately set by adjusting the magnitude of the bias current.

The output capability of the DACs used for data signals in digital input-type liquid crystal display devices is usually set at manufacture time based on simulation results using average characteristic values (load resistance value and load capacitance value of the video bus line) of liquid crystal panels. Incidentally, in recent years, following an increase in the definition and screen size of liquid crystal panels, multiple DACs used for data signals are sometimes provided in liquid crystal display devices. The larger the number of DACs is, the higher the probability of variation in the capability of the DACs becomes. When the DAC capability considerably deviates from the simulation results, power consumption increases in case of excessive output and display quality declines in case of deficient output.

Accordingly, there has in the past been proposed a DAC that compensates for variation in the output voltage and increases the productivity and yield of liquid crystal display devices by providing a voltage-adding circuit that adds an adjusting voltage to the output voltage of a DAC when low image quality is discovered in the process of inspection at manufacture time (see FIG. 1, Paragraph 0016; in JP2002-217734A).

DISCLOSURE OF INVENTION

The characteristics of liquid crystal panels in liquid crystal display devices are subject to considerable variation as a result of changes over time and the manufacturing conditions of the liquid crystal panel. Accordingly, the problem with the conventional method, in which the determination of the DAC output capability was based on the results of simulation of the characteristic values of liquid crystal panels, was that the excessive or deficient DAC output in liquid crystal display devices provided with liquid crystal panels with characteristics deviating from the average values was not eliminated. In addition, the DAC of JP2002-217734A mentioned above was adapted to determine the value of the adjusting voltage in response to an offset adjustment signal inputted from outside. However, JP2002-217734A did not clearly specify how the offset adjustment signal was supposed to be determined.

Accordingly, it is an object of the present invention to provide a liquid crystal display device, in which increased power consumption due to an excessive DAC capability and reduced display quality due to a deficient DAC capability do not occur as a result of dynamically adjusting the DAC capability such that variation in the characteristics of the liquid crystal panel is compensated.

In order to achieve the above-mentioned object, the liquid crystal display device of the present invention, which is a liquid crystal display device having liquid crystal sandwiched between a pair of substrates, includes: multiple signal lines arranged in a mutually parallel relationship on one of the substrates of the pair of substrates; a digital-to-analog converter circuit that converts data signals inputted as digital signals to analog signals, a signal line driver circuit that distributes and inputs the analog signals output from the digital-to-analog converter circuit to the multiple signal lines; a comparing circuit that compares a first voltage, which is the voltage of the analog signal detected on the input side of the signal lines, and a second voltage, which is the voltage of the analog signal detected on the side opposite the input side of the signal lines; and a correcting circuit that corrects the output of the digital-to-analog converter circuit based on the comparison results of the comparing circuit.

The present invention permits implementation of a liquid crystal display device, in which increased power consumption due to an excessive DAC capability and reduced display quality due to a deficient DAC capability are prevented by dynamically adjusting the DAC capability so as to compensate for variation in the characteristics of liquid crystal panels.

BRIEF DESCRIPTION OF DRAWINGS

FIG. 3 is a circuit diagram illustrating an exemplary configuration of a differential amplifier provided in a liquid crystal display device according to an embodiment of the present invention.

FIG. 4A is a diagram illustrating the timing of acquisition of voltage $V_1$ inputted to the differential amplifier, and FIG. 4B is a diagram illustrating the timing of acquisition of voltage $V_2$ inputted to the differential amplifier.

DESCRIPTION OF THE INVENTION

Figure 1:
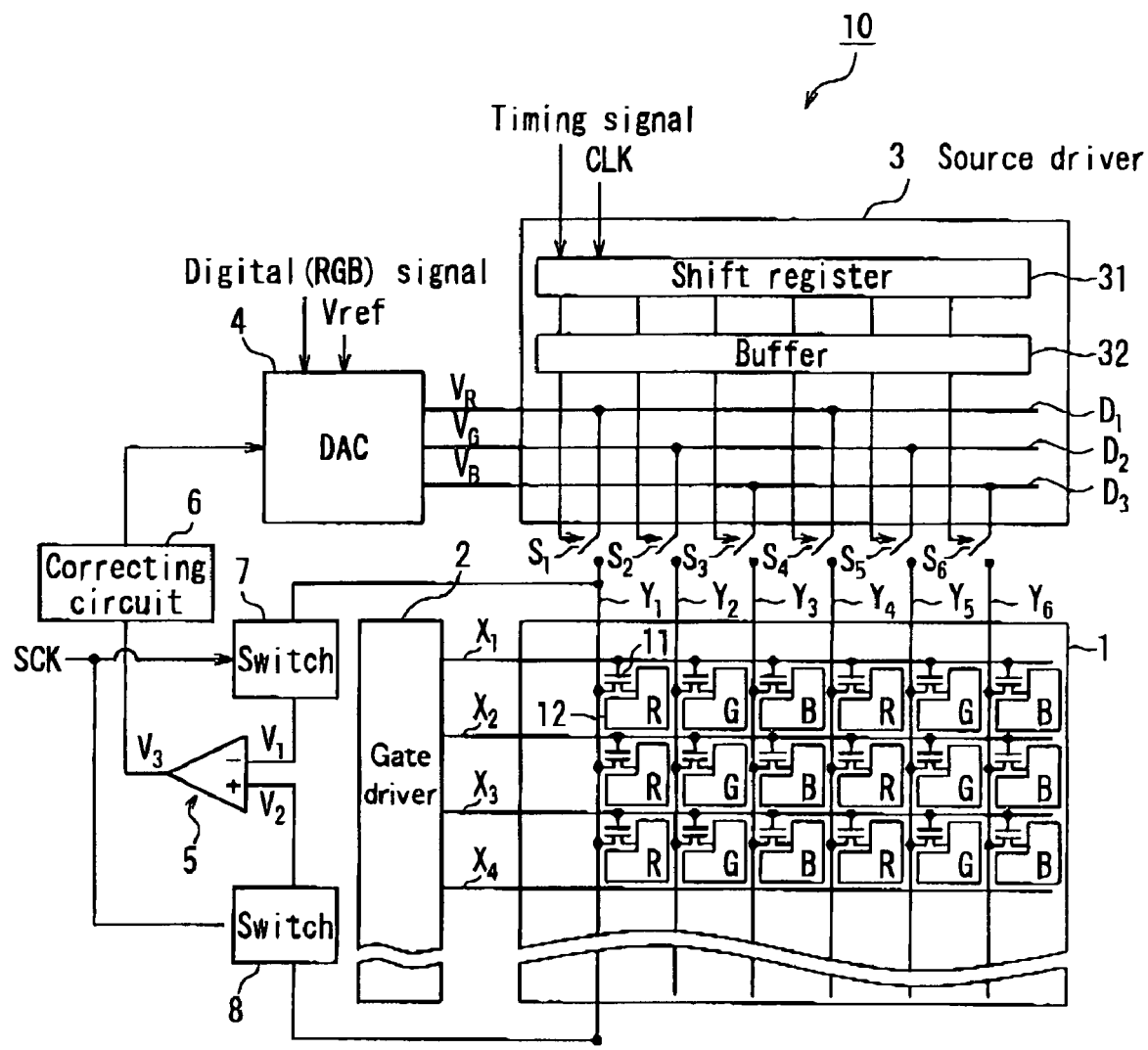
FIG. 1 is a block diagram schematically illustrating the configuration of a liquid crystal display device according to an embodiment of the present invention.

The liquid crystal display device of the present invention, which is a liquid crystal display device having liquid crystal sandwiched between a pair of substrates, includes: multiple signal lines arranged in a mutually parallel relationship on one of the substrates of the pair of substrates; a digital-to-analog converter circuit that converts data signals inputted as digital signals to analog signals; a signal line driver circuit that distributes and inputs the analog signals output from the digital-to-analog converter circuit to the multiple signal lines; a comparing circuit that compares a first voltage, which is the voltage of the analog signal detected on the input side of the signal lines, and a second voltage, which is the voltage of the analog signal detected on the side opposite the input side of the signal lines; and a correcting circuit that corrects the output of the digital-to-analog converter circuit based on the comparison results of the comparing circuit.

According to this configuration, the correcting circuit dynamically corrects the output capability of the digital-to-analog converter circuit based on the results of comparison of a first voltage, which is detected on the input side of the signal lines, and a second voltage, which is detected on the side opposite the input side of the signal lines. This permits implementation of a liquid crystal display device, in which variation in the characteristics of the liquid crystal panel is dynamically compensated, thereby preventing increased power consumption due to an excessive capability in the digital-to-analog converter circuit and reduced display quality due to a deficient capability. Furthermore, it also has the advantage of being able to appropriately adjust the output capability of the digital-to-analog converter circuit so as to match variation in the input voltage or panel load fluctuations associated with changes occurring over time or changes in the operating environment (temperature, humidity, etc.).

In the liquid crystal display device described above, the comparing circuit preferably includes a synchronizing unit used to align the timing of detection of the first voltage with the timing of detection of the second voltage.

Moreover, in the liquid crystal display device described above, the comparing circuit preferably includes a differential amplifier that amplifies and outputs a differential voltage of the first voltage and second voltage.

In the liquid crystal display device described above, the correcting circuit preferably corrects the output of the digital-to-analog converter circuit by adjusting the bias voltage of the digital-to-analog converter circuit based on the comparison results of the comparing circuit.

In the liquid crystal display device described above, the liquid crystal display preferably is a liquid crystal display utilizing continuous grain silicon.

Specific embodiments of the liquid crystal display device of the present invention are described below with reference to drawings.

FIG. 1 is a block diagram schematically illustrating the configuration of the active matrix substrate 10 of a liquid crystal display device according to the present embodiment. The liquid crystal display device according to the present embodiment is an active matrix type liquid crystal display device, in which liquid crystal is sandwiched between an active matrix substrate 10 and a facing substrate (not shown).

As shown in FIG. 1, the active-matrix substrate 10 basically has provided thereon a pixel unit 1, a gate driver 2, a source driver 3, a digital-to-analog converter circuit (DAC) 4, a differential amplifier 5, a correcting circuit 6 and a switch 7. It should be noted that although FIG. 1 shows only the main portion related to the features of the present invention, the liquid crystal display devices described in the embodiments of the present invention may include other arbitrary constituent elements.

It should be noted that the liquid crystal display device of the present embodiment is a full monolithic type liquid crystal display utilizing CG silicon (continuous grain silicon). Namely, the gate driver 2, source driver 3, D/A converter circuit (DAC) 4, differential amplifier 5, correcting circuit 6, as well as switch 7 and other peripheral circuitry are simultaneously formed using a semiconductor process, in which all the components of the pixel unit 1 are formed on a glass substrate (not shown).

As shown in FIG. 1, the pixel unit 1 has gate lines X ($X_1$, $X_2$ . . . ) arranged in a mutually parallel relationship, source lines Y ($Y_1$, $Y_2$ . . . ) arranged in a mutually parallel relationship transversely to the gate lines X, TFTs 11 arranged at the grid points of the gate lines X and source lines Y, aind pixel electrodes 12 connected to the TFTs 11.

It should be noted that, for simplicity of discussion, FIG. 1 shows only six source lines, four gate lines, and three DACs, with other elements omitted from the figure. A TFT (Thin Film Transistor) 11 is provided in the vicinity of each point of intersection between the gate lines X and source lines Y. In the TFTs 11, a gate electrode is connected to a gate line X, a source electrode is connected to a source line Y, and a drain electrode is connected to a pixel electrode 12.

It should be noted that, in the example of FIG. 1, the respective pixel electrodes 12 are marked Red (R), Green (G), and Blue (B) depending on which color of the color filter they correspond to in other words, the liquid crystal display device of the present embodiment illustrated in FIG. 1 has color filters arranged in a "striped" configuration (multi-color). The present invention, however, is not limited solely to multi-color mode display devices, such as the one shown in FIG. 1, and can be applied to full color-mode display devices having RGB color filters arranged in a "delta" configuration, as well as to color-mode display devices utilizing non-RGB color filters. Moreover, it is applicable to display devices capable only of black-and-white and half-tone (gray) display.

The gate lines X are connected to a gate driver 2. The source lines Y are connected via time-sharing switches S ($S_1$, $S_2$ . . . ) to the data lines $D_1$-$D_3$, to which the analog data signals $V_R$, $V_G$, and $V_B$ are supplied from the DAC 4. In the example of FIG. 1, the source lines $Y_1$, $Y_4$ . . . are connected to the data line $D_1$. Moreover, the source lines $Y_2$, $Y_5$ . . . are connected to the data line $D_2$. Furthermore, the source lines $Y_3$, $Y_6$ . . . are connected to the data line $D_3$.

During each single horizontal period, the gate driver 2 successively selects the gate lines $X_1$, $X_2$ . . . for each row and applies a select voltage thereto During each single horizontal period, based on clock and timing signals, the source driver 3 uses the shift register 31 and buffer 32 to simultaneously turn the switches $S_1$, $S_2$ and $S_3$ ON and successively turn the DAC ON, thereby enabling the source lines $Y_1$, $Y_2$, and $Y_3$ to successively pass current to the data lines $D_1$-$D_3$.

The DAC 4 converts a digital RGB signal provided by a controller (not shown) to the analog data signals $V_R$, $V_G$, and $V_B$ based on a reference voltage $V_{ref}$. The analog data signals $V_R$, $V_G$ and $V_B$ are supplied to the date lines $D_1$-$D_3$ and written to pixels when the switches $S_1$, $S_2$ . . . are turned ON. In other words, the driving scheme of the liquid crystal display device of the present embodiment is the point-at-a-time driving scheme.

Figure 2:
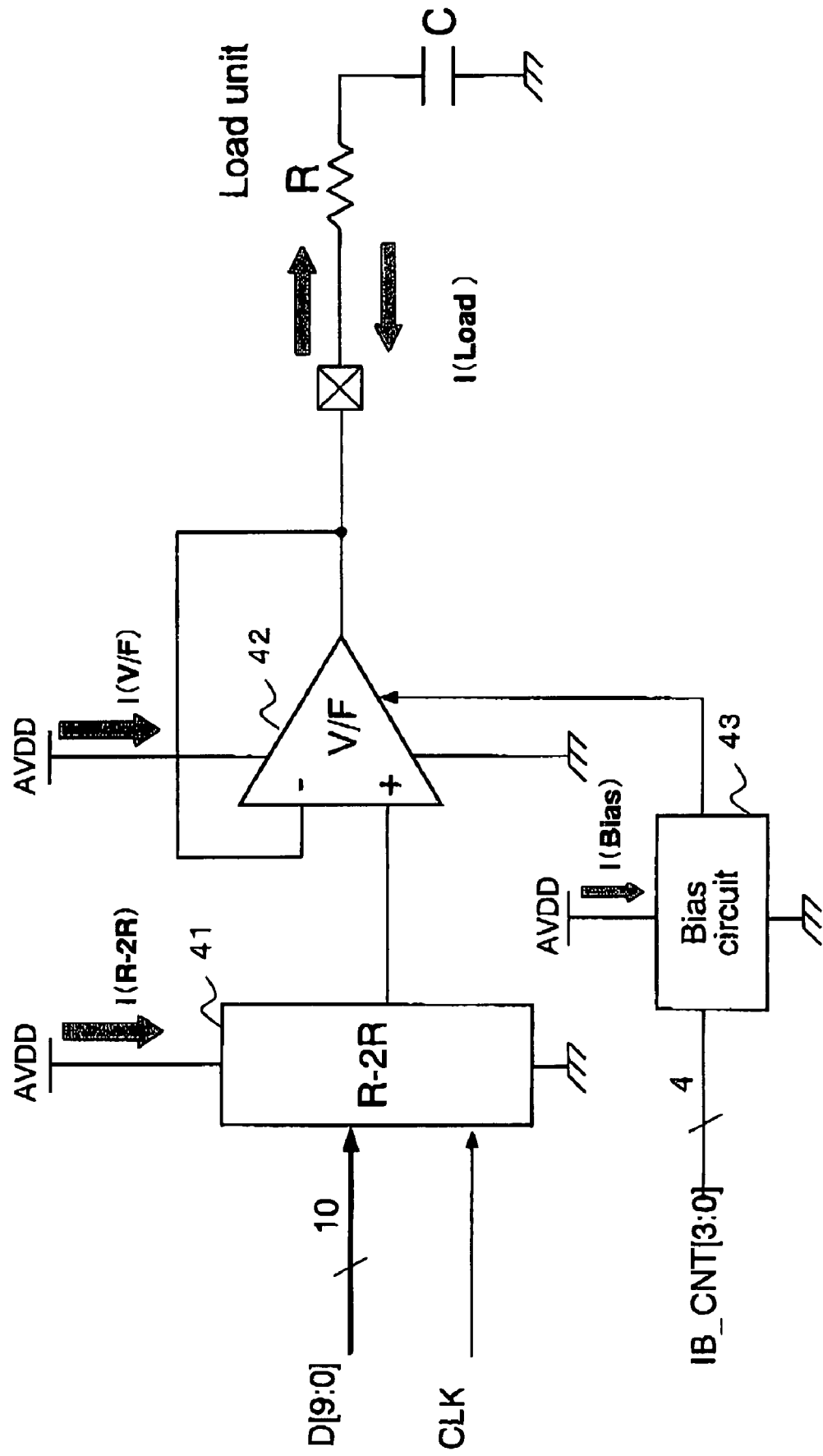
FIG. 2 is a circuit diagram illustrating an exemplary configuration of a DAC provided in a liquid crystal display device according to an embodiment of the present invention.

An R-2R resistor ladder type DAC, e.g. such as the one illustrated in FIG. 2, can be used as the DAC 4. In the example shown in FIG. 2, the DAC 4 includes an R-2R resistor array 41, a buffer amplifier 42 connected to the output side (load unit side) of the R-2R resistor array 41, and a bias circuit 43 adjusting the output capability of the buffer amplifier 42 by supplying a bills current to the buffer amplifier 42.

It should be noted that the DAC 4 may be incorporated into the source driver 3 or a liquid crystal driving controller (not shown), or may be mounted on a glass substrate, an FPC (Flexible Printed Circuit), or a printed wiring board (PWB: Printed Wiring Board) as a separate chip.

The differential amplifier 5 outputs to the correcting circuit 6 a signal $V_3$, which is obtained by amplifying a differential voltage (if the output voltage $V_1$ of the switch 7 and voltage $V_2$ at the end of the source line $Y_1$ on the side opposite the data signal input end (the side of the source driver 3). Namely, the differential amplifier 5 detects the difference between the voltage (first voltage ($V_1$)) on the input side of the source line $Y_1$, to which an analog data signal $V_R$ is supplied, and the voltage (second voltage ($V_2$)) on the side opposite the input side. An exemplary configuration of the differential amplifier 6 is illustrated in FIG. 3. As shown in FIG. 3, the differential amplifier 5 can be formed using transistors. Accordingly, the differential amplifier 5 can be formed on the active-matrix substrate 10 simultaneously with the TFTs 11 using the semiconductor process employed when forming the TFTs 11 of the pixel unit 1.

The switches 7, 8 operate as a synchronizing unit used to align the timing of detection of the first voltage $V_1$ with the timing of detection of the second voltage $V_2$. Namely, when the clock SCK goes Hi, the switch 7 becomes conductive (turns ON) and outputs the first voltage $V_1$ to the differential amplifier 5. When the clock SCK goes Hi, the switch 8 becomes conductive (turns ON) and outputs the second voltage $V_2$ to the differential amplifier 5. It should be noted that the "ON" timing of the switches 7, 8 preferably is controlled by considering output delay. Since the switches 7, 8 can be implemented e.g. as TFT switches, they can be formed on the active-matrix substrate 10 simultaneously with the TFTs 11 using the semiconductor process employed when forming the TFTs 11 of the pixel unit 1.

The above-mentioned clock SCK provided to the switches 7, 8 is obtained by dividing a clock provided to the source driver 3 (clock CLK shown in FIG. 1) by the (total number of source lines Y–1). It should be noted that the circuitry used to generate the SCK from the CLK is omitted in FIG. 1.

As shown in FIGS. 4A and 4B, the voltages $V_1$ and $V_2$ provided as inputs to the differential amplifier 5 are acquired using the trailing edge timing of the SCK. In order to set the output of the DAC 4 to appropriate values, the correcting circuit 6 adjusts the bias current of the DAC 4 as described below in accordance with the results of comparison between the output voltage $V_3$ of the differential amplifier 5 and two predetermined thresholds $e_1$ and $e_2$ ($e_1 < e_2$). It should be noted that, if the amplification of the differential amplifier 5 is designated as CL, the two threshold values $e_1$ and $e_2$ will approximately be $e_1 = \alpha(V_{1max} - 0.98 \times V_{1max})$ and $e_2 = \alpha(V_{1max} - 0.96 \times V_{1max})$.

Figures 5A, 5B:
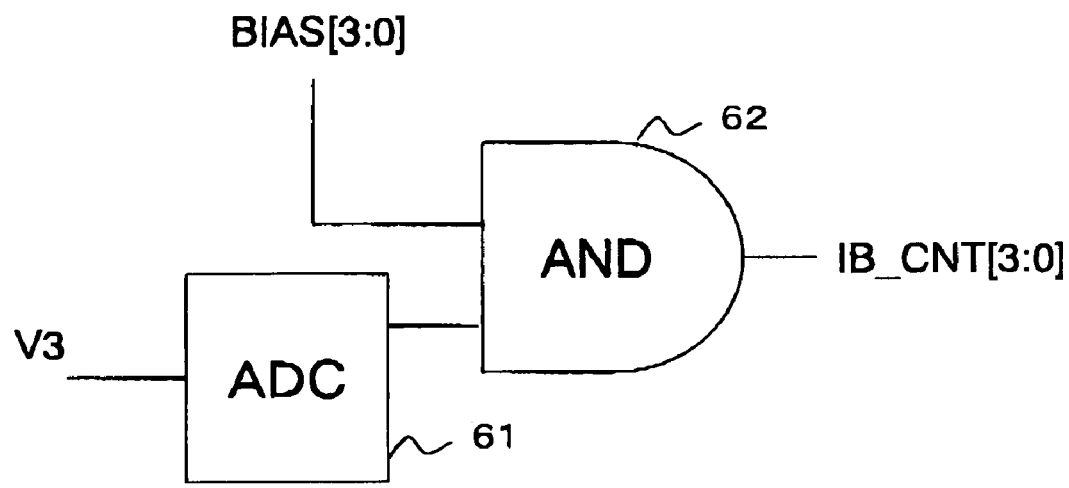
FIG. 5A is a circuit diagram illustrating an exemplary configuration of a correcting circuit provided in a liquid crystal display device according to an embodiment of the present invention.
FIG. 5B is a diagram illustrating the relationship between the output of the correcting circuit and DAC output capability adjustment.
Figure 6A:
FIG. 6A-FIG. 6C are diagrams illustrating exemplary data signal waveforms in a conventional liquid crystal display device.
Figure 6B:
Figure 6C:

An exemplary configuration of the correcting circuit 6 is illustrated here in FIG. 5A. The correcting circuit 6 illustrated in FIG. 5A includes an analog-to-digital converter (ADC) 61 and an AND circuit 62. The ADC 61 converts the output voltage $V_3$ of the differential amplifier 5 to a 4-bit digital signal and outputs it to the AND circuit 62. The AND circuit 62 performs a multiplication operation on the output of the ADC 61 and BIAS[3:0], which is the present bias current setting, and outputs the results to the DAC 4 as IB™NT[3:0]. It should be noted that although, by way of illustration, the bias current setting used here is "4-bit", this is merely an example.

As shown in FIG. 5B, when $e_1 \geq \alpha \cdot V_3$, the correcting circuit 6 determines that the output of the DAC 4 is excessive and corrects the parameters of the DAC 4 so as to bring the output of the DAC 4 under control. For example, when the DAC 4 is of the R-2R resistor ladder type, as in the present embodiment (see FIG. 2), the bias current supplied from the bias circuit 43 is adjusted so as to change the capability of the buffer amplifier 42 connected to the output of the R-2R resistor array 41 and make the rise portion of the output waveform of the DAC 4 less abrupt. Moreover, when $e_1 \leq \alpha \cdot V_3 < e_2$, it determines that the output of the DAC 4 is appropriate and maintains the value of the bias current as it is. On the other hand, when $e_2 < \alpha \cdot V_3$, the correcting circuit 6 determines that the output of the DAC 4 is deficient and corrects the parameters of the DAC 4 so as to raise the output of the DAC 4. For example, in the present embodiment, the bias current supplied from the bias circuit 43 is adjusted so that the rise portion of the output waveform of the DAC 4 becomes steeper.

It should be noted that the values of the above-mentioned thresholds $e_1$ and $e_2$, as well as the type of the parameters of the DAC 4 and the amount of correction, can be designed in an arbitrary fashion in accordance with the configuration of the DAC and the configuration of each liquid crystal display device. In addition, the use of two thresholds as decision criteria in the manner described above is not obligatory.

As described above, the liquid crystal display device of the present embodiment uses the differential amplifier 5 to detect the differential between the voltage on the input side of a source line Y, to which an analog data signal is supplied, and the voltage on the side opposite the input side, with the correcting circuit 6 adjusting the output of the DAC in accordance with the results of comparison between the differential and the predetermined threshold values. This makes it possible to dynamically adjust the DAC output capability in accordance with the panel characteristics (panel load) of individual liquid crystal display devices. As a result, a liquid crystal display device can be implemented, in which increased power consumption due to an excessive DAC capability or reduced display quality due to a deficient DAC capability does not occur. In addition, since during its operation the liquid crystal display device of the present embodiment can dynamically adjust the output capability of the DAC 4, it can appropriately adjust the output of the DAC to match variation in the input voltage and fluctuations in the panel load associated with changes occurring over time and changes in the operating environment (temperature, humidity, etc.).

It should be noted that the embodiments of the present invention are not limited to the above-described configurations and permit various modifications within the scope of the invention.

For instance, the above-described embodiment showed a configuration, in which the present invention was applied to a liquid crystal display device utilizing the single-phase point-at-a-time driving scheme. The present invention, however, is also applicable to liquid crystal display devices utilizing the multi-phase point-at-a-time driving scheme (a driving scheme, in which the source lines are divided into several groups, with each group of the source lines driven using a separate shift register). It should be noted that in case of a liquid crystal display device utilizing the multi phase driving scheme with a separate DAC provided for each one of the above-mentioned groups, to adjust the output capability of the respective DACs, it is preferable to detect a differential between the voltage on the side where the analog data signal is input and the side opposite the input slide on at least one source line in each of these groups. This can eliminate variation in the DAC capability and achieve uniform display across the entire panel.

Furthermore, the scope of the present invention is not limited to liquid crystal display devices utilizing the point-at-a-time driving scheme. In case of a liquid crystal display device utilizing the line-at-a-time driving scheme, a DAC is provided for each source line. Here, a configuration may be used, in which a differential is detected between the voltage on the side where the analog data signal is input and the voltage on the side opposite the input side on at least one of the source lines and the output capability of all the DACs is adjusted based on the detection results. Alternatively, a configuration is contemplated, in which the source lines are divided into several groups, and a voltage differential is detected between the side where the analog data signal is input and the voltage on the side opposite the input side on one source line in each group, with the DAC output capability of the groups adjusted based on the detection results.

Moreover, the embodiment described above showed an example, in which the differential between the voltage on the input side and the voltage on the side opposite the input side is detected on the source line $Y_1$ located closest to the gate driver 2 in the pixel unit 1. However, the choice of which line to use for the detection of the voltage differential of the analog data signal is arbitrary. For instance, the voltage differential may be detected on a source line located in the vicinity of the center among the source lines $Y_1, Y_2 \ldots$ arranged in a mutually parallel relationship.

Moreover, although in the embodiment described above, the voltage differential was detected on only one source line, a configuration may be used, in which respective differentials in voltage on the input side and the opposite side are detected on multiple source lines, with the correcting circuit 6 determining the amount of adjustment of the parameters of the DAC 4 by considering the detected differentials together (for instance, computing an average of these differentials, etc.). For instance, the amount of adjustment of the parameters of the DAC 4 can be determined with account taken of the overall panel load of the pixel unit 1 if a configuration is used, in which the differentials are detected on multiple source lines selected from the source lines $Y_1, Y_2 \ldots$ in a uniform fashion.

Furthermore, the above-mentioned embodiment showed a configuration, in which a DAC performing D/A conversion of data signals was provided outside of the source driver. However, the present invention is not limited to such a configuration and a configuration may be used, in which the DAC is provided in the source driver.

Moreover, although the present embodiment showed a full monolithic type liquid crystal display device, the scope of the present invention is not limited to full monolithic type liquid crystal display devices. For example, a configuration can be used, in which part of the peripheral circuitry, such as the differential amplifier 5 or correcting circuit 6, is provided on a glass substrate using COG (Chip On Glass) technology. Alternatively, a configuration can be used, in which part of the peripheral circuitry is provided outside the liquid crystal panel.

Industrial Applicability

The present invention can be utilized as a liquid crystal display device, in which increased power consumption due to an excessive DAC capability or decreased display quality due to a deficient DAC capability does not occur.

The invention claimed is:

1. A liquid crystal display device having liquid crystal sandwiched between a pair of substrates, comprising:
   a plurality of signal lines arranged in a mutually parallel relationship on one of the substrates of the pair of substrates;
   a digital-to-analog converter circuit that converts data signals inputted as digital signals to analog signals;
   a signal line driver circuit that distributes and inputs the analog signals output from the digital-to-analog converter circuit to the plurality of signal lines;
   a comparing circuit that compares a first voltage, which is the voltage of the analog signal detected on the input side of the signal lines, and a second voltage, which is the voltage of the analog signal detected on the side opposite the input side of the signal lines; and
   a correcting circuit that corrects the output of the digital-to-analog converter circuit based on the comparison results of the comparing circuit.

2. The liquid crystal display device according to claim 1, wherein the comparing circuit comprises a synchronizing unit used to align the timing of detection of the first voltage with the timing of detection of the second voltage.

3. The liquid crystal display device according to claim 1, wherein the comparing circuit comprises a differential amplifier that amplifies and outputs a differential voltage of the first voltage and second voltage.

4. The liquid crystal display device according to claim 1, wherein the correcting circuit corrects the output of the digital-to-analog converter circuit by adjusting the bias voltage of the digital-to-analog converter circuit based on the comparison results of the comparing circuit.

5. The liquid crystal display device according to claim 1, wherein the liquid crystal display device is a liquid crystal display device utilizing continuous grain silicon.

6. The liquid crystal display device according to claim 2, wherein the liquid crystal display device is a liquid crystal display device utilizing continuous grain silicon.

7. The liquid crystal display device according to claim 3, wherein the liquid crystal display device is a liquid crystal display device utilizing continuous grain silicon.

8. The liquid crystal display device according to claim 4, wherein the liquid crystal display device is a liquid crystal display device utilizing continuous grain silicon.

* * * * *